United States Patent [19]

Feser

[11] Patent Number: 4,838,402
[45] Date of Patent: Jun. 13, 1989

[54] SLIDING SLEEVE OF A CLUTCH OF AN AUTOMOTIVE VEHICLE

[75] Inventor: Winfried Feser, Schonungen, Fed. Rep. of Germany

[73] Assignee: FAG Kugelfischer Georg Schafer (KGaA), Fed. Rep. of Germany

[21] Appl. No.: 160,144

[22] Filed: Feb. 25, 1988

[30] Foreign Application Priority Data

Mar. 20, 1987 [DE] Fed. Rep. of Germany ....... 3709237

[51] Int. Cl.$^4$ ............................................. F16D 23/14
[52] U.S. Cl. .................. 192/98; 192/110 B; 384/482; 384/140; 277/152
[58] Field of Search .............. 192/98, 110 B; 384/482, 384/140; 277/82, 84, 152, 153

[56] References Cited

U.S. PATENT DOCUMENTS

| 4,650,195 | 3/1987 | Dreschmann et al. | 277/152 |
| 4,653,626 | 3/1987 | Limbacher | 192/98 |
| 4,695,062 | 9/1987 | Dreschmann et al. | 277/84 |

FOREIGN PATENT DOCUMENTS

| 2242140 | 3/1974 | Fed. Rep. of Germany | 192/98 |
| 3540225 | 5/1987 | Fed. Rep. of Germany | 192/110 B |
| 2166511 | 5/1986 | United Kingdom | 192/98 |

*Primary Examiner*—Rodney H. Bonck
*Assistant Examiner*—Andrea Pitts
*Attorney, Agent, or Firm*—Ostrolenk, Faber, Gerb & Soffen

[57] ABSTRACT

A sliding sleeve of a clutch of an automotive vehicle or the like, includes a radially adjustable anti-friction bearing. A cap supported on the sleeve extends around and is spaced from the bearing thereby defining a radial slot. A generally L-shaped spring ring has one leg which extends over the radial outside of the outer ring and is obliquely inclined outwardly so that its end engages the interior of a cap. The other leg of the spring ring extends radially inward past the axial outer end of the outer ring, is formed locked to the outer ring, and includes a sealing lip portion which extends into engagement with the surface of the inner ring for sealing the space between the outer and inner rings. The inner ring has a radially outward flange, and the sealing lip on the other leg of the spring ring engages the axially inward face of the radially projecting flange of the inner ring. In an alternate emboidment, the second leg of the spring ring is V-shaped and extends radially inward past the sealing lip and makes additional contact with the radial outside of the inner ring. The spring ring is of plastic material. It includes at its central portion an L-shaped sheet metal insert extending over the radial outside of the outer ring, axially down past the bearing outer ring for stiffening the spring ring.

12 Claims, 1 Drawing Sheet

SLIDING SLEEVE OF A CLUTCH OF AN AUTOMOTIVE VEHICLE

BACKGROUND OF THE INVENTION

The present invention relates to a sliding sleeve of a clutch, in an automotive vehicle or for like purposes, for use with a radially adjustable antifriction bearing.

A sliding sleeve having an anti-friction bearing of the above-indicated type is known from Federal Republic of Germany Pat. No. 22 42 140. Positioned in the radial slot between the outer ring of the bearing and the cap of the sliding sleeve is the obliquely inclined leg of an L-shaped spring ring. This produces radially directed spring-action of the outer ring in the sliding sleeve. The inclined leg of the spring ring is comprised of spring-action extensions with free spaces between neighboring extensions. This development has an essential disadvantage. Experience has shown that lubricant passes out of the anti-friction bearing into the radial slot between the outer ring and the cap of the sliding sleeve. The free spaces in the inclined leg prevent retention of the lubricant in the sliding sleeve. Since no other obstacles to the passage of lubricant are provided, the lubricant passes to the outside of the bearing. This increases the danger of insufficient lubrication in the anti-friction bearing. Furthermore, the lubricant which has escaped can lead to disturbances in operation when it, for instance, passes into the region of the clutch linings.

The second leg of the spring ring is intended to serve as a seal for the anti-friction bearing. But it also does not fulfill its purpose. The spring ring is rigidly connected to the sliding sleeve and can thus not participate in the radial movements of the antifriction bearing. There must therefore always be a slot between the seal and the inner ring. This also leads to the emergence of lubricant, with the disadvantage indicated above.

SUMMARY OF THE INVENTION

It is therefore the object of the invention to improve the above-mentioned sliding sleeve so that no lubricant emerges from the housing of the sliding sleeve.

The present invention concerns the sliding sleeve of a clutch. The clutch includes a radially adjustable antifriction bearing. A cap is disposed around and is spaced radially outward from the rim surface of the outer ring of the bearing and the cap is supported by a radially outwardly projecting flange from the sliding sleeve of the clutch. The inventive feature concerns a generally L-shaped spring ring. One leg of the spring ring extends in an annular slot along the ring surface of the outer ring and then inclines obliquely radially outward, moving axially inward of the bearing, until the free end of that one leg of the spring ring rests against the inner surface of the cap. The second leg of the spring ring extends radially inward past the axially outward end of the outer ring to which it is form-locked and then extends further radially inward into engagement with the inner ring at a sealing lip of the second leg. This seals the bearing against passage of material past both the first leg and the second leg of the spring ring.

The inner ring of the bearing has a radially outwardly projecting flange which extends up toward and is somewhat outward of the axially outward end of the outer ring of the bearing. The second leg of the spring ring is shaped so that the sealing lip thereon extends axially against the axially inward side of the radial flange in the inner ring. According to the invention, the second leg of the spring ring has a generally V-shaped cross-section, and the vertex of the V defines the sealing lip in engagement with the flange of the inner ring. The second leg continues beyond the vertex and presses against the radially external rim surface of the inner ring axially inward of the radial flange of the inner ring.

The spring ring is normally comprised of plastic material. To stiffen its second leg, intermediate the length of the spring ring, it includes a generally L-shaped metal insert; and the spring ring extends past both ends of the insert. The cap and spring ring may be so shaped that the sping ring is in light rubbing contact with the cap.

Because the spring ring part that is arranged in the radial slot is comprised of a circumferential, obliquely inclined, unbroken portion of plastic, no lubricant can pass to the outside around the outer ring of the bearing. This spring ring acts both as a radial reset element and also as a seal. To accomplish both functions in optimal fashion, the spring ring is fastened in form-locked manner on the outer ring of the bearing. In a preferred embodiment, it grips in form-locked manner in separate sections around the outer ring. In this way, the spring ring is prevented from assuming positions which might harm operation or permit lubricant loss.

The second leg of the anti-friction bearing acts as a seal. It is also comprised of plastic. It includes a sealing lip that comes axially against the radially outwardly projecting flange of the inner ring of the bearing. In order to increase the sealing action toward the inner ring of the bearing, it is preferable to provide the sealing lip with a V-shaped partial cross-section at its portion radially toward the inner ring. The connection portion or vertex of the V defines the sealing lip that rests agaisnst the radially outwardly projecting flange of the inner ring. The free still further radially inward end of the sealing lip rests against the radially outwardly facing rim surface of the inner ring, axially inward of the radially outwardly projecting flange of the inner ring. A double seal is thus obtained against the inner ring with the single sealing lip.

Since the sealing lip should have a certain stability, it is comprised, at least in the central portion, of a spring ring of sheet metal. The radially directed leg of this sheet-metal insert lies directly against the radial flnage of the cap of the sliding sleeve, which passes radially inward past the edge of the outer ring of the bearing. In this way, the desirable radial displaceability of the anti-friction bearing is not excessively braked.

The radial slot between the outer ring of the bearing and the sliding-sleeve cap must not exceed a certain value. On the other hand, the spring-ring part arranged therein requires a certain amount of space. According to a preferred embodiment, this ring is arranged in a groove which is defined in the circumferential wall region of the outer ring of the bearing.

Other objects and features of the invention are explained with reference to the accompanying drawings.

DESCRIPTION OF THE PREFERRED EMBODIMENTS

Figure 1:
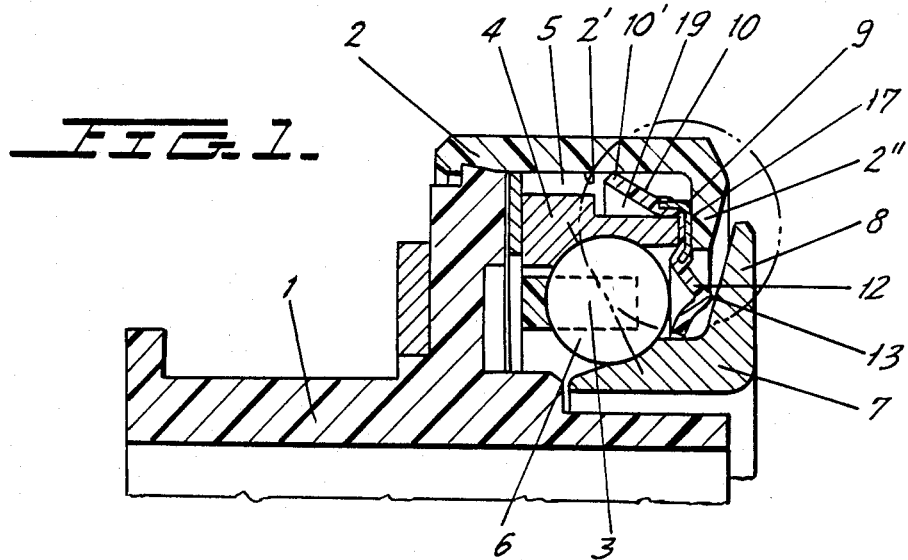
FIG. 1 is a partial cross-section through a sliding sleeve in accordance with the invention.

According to FIG. 1, the sliding sleeve is comprised of the axially elongate sliding part 1. The cap 2 is disposed toward the axial end of the sleeve 1. Axially inward of the bearing 3, the sliding sleeve includes an outwardly projecting flange to which is fastened the cap 2. The cap 2 surrounds the angular contact ball bearing 3 located at the axial end of the sliding part 1.

The bearing 3 comprises the outer ring 4, with an outer rim surface which faces radially outward toward the radial slot 5. Radially outward past the slot 5 is the cap 2. Radially inward of the outer ring 4 are the row of bearing balls 6. Radially inward of the row of balls is the inner ring 7. The inner ring is provided with a radially outwardly porjecting flange 8 at the axially outward end of the inner ring that extends at least partially past the outer ring and is axially outward of the outer ring. That flange 8 is provided for the application of a known clutch disengagement means (not shown).

A generally L-shaped spring ring 9 provides for radial centering of the ball bearing 3 in the sliding sleeve and seals the bearing. The L-shaped spring ring comprises a first leg 10 which is arranged radially outward of the outer bearing ring 4 in the radial slot 5. The leg 10 has a portion comprised of plastic and which is obliquely inclined both radially outwardly and axially inwardly to its outer end 10' which rests, with initial tension, against the interior or borehole surface 2' of the cap 2. Because the leg 10 fills up the space in the annular slot 5 without interruption along or in the leg 10, also acts simultaneously as a good seal, which does not permit the passage by the leg 10 of any lubricant which collects in the slot 5 during bearing operation.

Generally at its central part along its length, the L-shaped spring ring 9 is fastened in formlocked manner on the axially outer end of the outer ring 4. An axial leg portion 11 (see FIG. 2) of that central part places itself with initial tension against the radial outside of the outer ring 4. This enables the second, radially more inward leg 12, which serves as a sealing ring for the end of the bearing, to always have the same distance from the inner ring 7 so that the leg 12 can come to rest against the inner ring without problem.

In FIG. 1, the contact between the leg 12 and the inner ring 7 occurs through a sealing lip 13 of plastic on the leg, which comes to rest axially on the radially projecting flange 8 of the inner ring 7.

Figure 2:
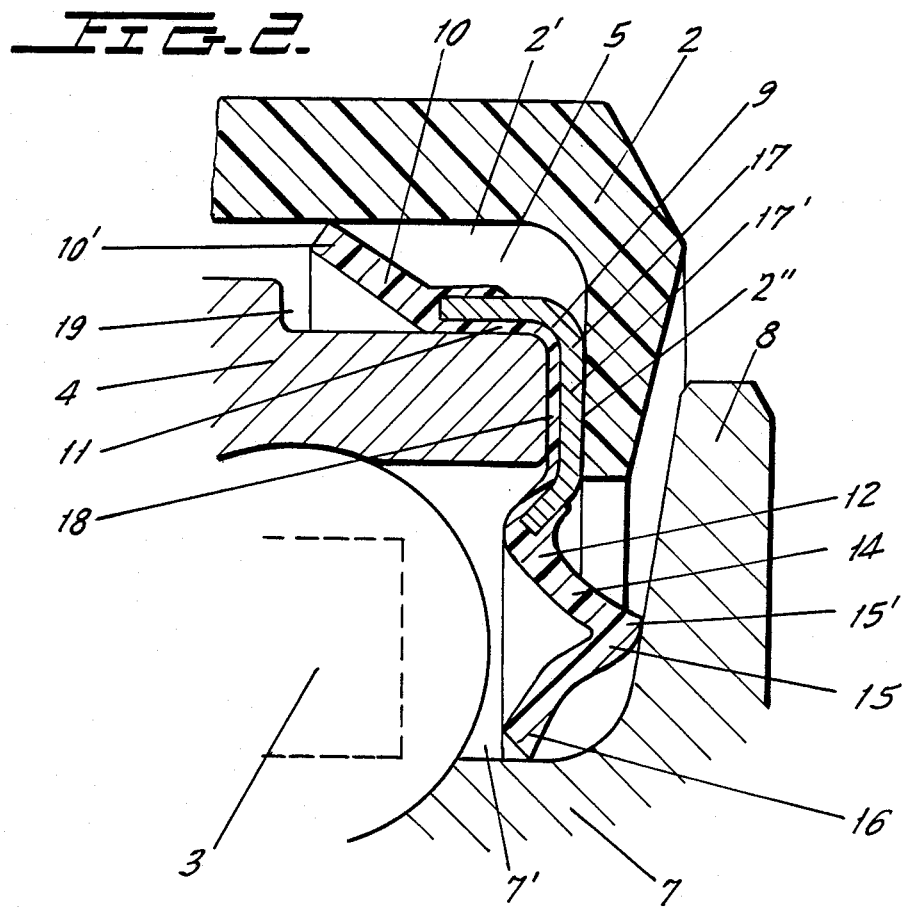
FIG. 2 shows an enlarged portion of the sliding sleeve of FIG. 1 with a different inner seal.

In order to further increase the sealing action by the spring ring, the leg 12 continues radially inward beyond its initial contact at sealing lip 13, with the flange 8. A sealing lip 14 is developed in V-shape cross-section, as shown in FIG. 2. The axially outer edge 15' of the connecting portion 15 of the lip 14 comes to rest on the flange 8 of the inner ring 7 and acts there like the sealing lip 13 of FIG. 1. The free, radially further inward end 16 of the sealing lip 14 slides on the radially outward rim surface 7' of the inner ring 7. Three annular lines of contact are thereby established, by the sealing lip 14 at 15' and 16 and by the lip 10'.

Since a spring ring 9 which is comprised entirely of plastic may not have the required strength and stability, an L-shaped sheet-metal insert 17 is provided, as shown in FIG. 2, in the central portion of the ring 9. A plastic coating 18 axially inward of the insert 17 connects the legs 10 and 12 of the spring ring to each other. The radial leg 17' of the insert 17 lies axially directly on the interior of the radial flange 2" of the cap 2 which does not cause an impermissibly high braking action. Such braking action must be avoided so that the anti-friction bearing can adjust itself radially in the desired manner. As suggested in FIG. 1, the plastic coating 18 rests on the end portion of the ring to which the spring ring 9 is secured.

For considerations of space, the leg 10 and the axial leg portion 11 of the spring ring 9 are inserted in a radial cutout or groove 19 defined in the axially outward, radially outside wall region of the outer ring 4.

Although the present invention has been described in connection with preferred embodiments thereof, many variations and modifications will now become apparent to those skilled in the art. It is preferred, therefore, that the present invention be limited not by the specific disclosure herein, but only by the appended claims.

What is claimed is:

1. A sliding sleeve of a clutch, comprising:

the clutch including a radially adjustable anti-friction bearing comprising an outer ring having a radially exterior rim surface, an inner ring radially inward of the outer ring, the inner ring having a respective radially exterior rim surface, the outer and inner rings having respective axially outward ends toward one axial side thereof; and rolling elements disposed between the inner and outer rings for rolling between them;

a cap having an inner surface around and space radially outwardly of the rim surface of the outer ring and defining an annular slot between the outer ring rim surface and the inner surface of the cap; the sliding sleeve including a radially outwardly projecting flange located axially inward of the outer and inner rings of the bearing, the cap being supported on and being positioned by the flange;

a generally L-shaped spring ring having a first axial leg which extends in the annular slot along the rim surface of the outer ring, the first leg extending obliquely radially outward in the direction axially inward of the bearing, the first leg of the spring ring extending sufficiently to rest against the inner surface of the cap for forming a seal at the cap and also for centering the bearing on the sleeve;

the spring ring having a second radial leg which extends radially inward past the axially outward end of the outer ring and which is shaped for gripping to the outer ring at the axially outward end thereof to engage and lock against the second leg, the second leg extending radially further inward, the second leg including a sealing lip that extends into engagement with the inner ring at the sealing lip of the second leg for sealing the bearing by sealing passage of material past the second leg between the inner and the outer rings.

2. The sliding sleeve of claim 1, wherein axially outward of the rolling elements, the inner ring comprises a radially outwardly projecting flange which extends up toward and is axially outward of the axially outward end of the outer ring; the second leg of the spring ring is shaped so that the sealing lip of the second leg extends axially against the axially inward side of the radial flange of the inner ring.

3. the sliding sleeve of claim 2, wherein the second leg of the spring ring has a generally V-shaped cross-section, with the vertex of the V defining the sealing lip being in engagement with the flange of the inner ring and the second leg having an end beyond the vertex of the V, the end of the second leg pressing against the portion of the rim surface of the inner ring axially inward of the flange.

4. The sliding sleeve of claim 3, wherein the spring ring is locked to the outer ring by extending past the axially outward end of the outer ring and wrapping up over the exterior rim surface of the outer ring; a generally L-shaped metal insert for stiffening the spring ring being included at the section of the spring ring passing the axially outward end of the outer ring, and the remainder of the spring ring being comprised of plastic material.

5. The sliding sleeve of claim 4, wherein the plastic material of the spring ring extends at both ends beyond the metal insert and also extends over the metal insert so as to be between the metal insert and the outer ring, the plastic material of the spring ring engages the outer ring.

6. The sliding sleeve of claim 3, wherein the rim surface of the outer ring toward the axially outward end thereof has a groove defined therein and the axially extending portion of the first leg of the spring part extends in the groove and there engages the outer ring.

7. The sliding sleeve of claim 1, wherein the second leg of the spring ring is generally V-shaped in cross-section, wherein both the vertex of the V and the free end of the second leg beyond the V rest against the surface of the inner ring and the vertex of the V defines the sealing lip.

8. The sliding sleeve of claim 1, wherein the spring ring is locked to the outer ring by extending past the axially outward end of the outer ring and wrapping up over the exterior rim surface of the outer ring; a generally L-shaped metal insert for stiffening the spring ring being included at the section of the spring ring passing the axially outward end of the outer ring, and the remainder of the spring ring being comprised of plastic material.

9. The sliding sleeve of claim 8, wherein the plastic material of the spring ring extends at both ends beyond the metal insert and also extends over the metal insert so as to be between the metal insert and the outer ring, the plastic material of the spring ring engages the outer ring.

10. The sliding sleeve of claim 8, wherein the cap includes a radial portion that extends radially inward past the axial outward end of the outer ring, the spring ring is in light rubbing contact with the axially inwardly facing surface of the portion of the cap extending past the outer ring.

11. The sliding sleeve of claim 10, wherein the plastic material of the spring ring extends at both ends beyond the metal insert and also extends over the metal insert so as to be between the metal insert and the outer ring, the plastic material of the spring ring engages the outer ring; the spring ring being in contact with the cap by the metal insert thereof contacting the cap.

12. The sliding sleeve of claim 1, wherein the rim surface of the outer ring toward the axially outward end thereof has a groove defined therein and the axially extending portion of the first leg of the spring part extends in the groove and there engages the outer ring.

* * * * *